Sept. 26, 1939. R. G. FISHEL Re. 21,214
COOKING UTENSIL
Original Filed Nov. 12, 1936
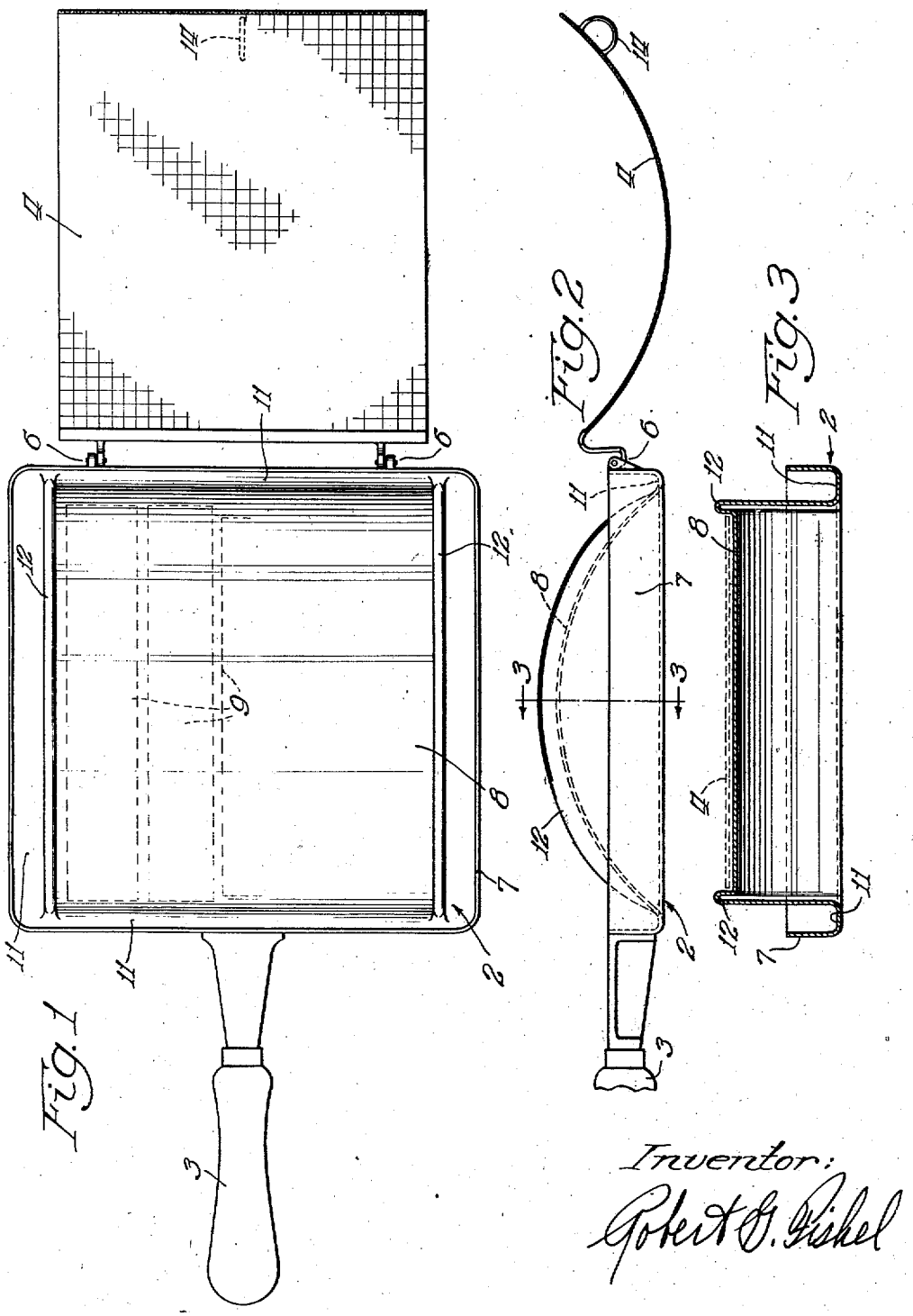
Inventor:
Robert G. Fishel Reissued Sept. 26, 1939

Re. 21,214

UNITED STATES PATENT OFFICE 21,214

COOKING UTENSIL

Robert G. Fishel, Evanston, Ill.

Original No. 2,085,306, dated June 29, 1937, Serial No. 110,427, November 12, 1936. Application for reissue January 28, 1939, Serial No. 253,451

7 Claims. (Cl. 53—5)

This invention relates to improvements in cooking utensils, and more particularly to a utensil for the frying of sliced bacon and other thinly sliced meats.

An object of the invention is to provide an improved cooking utensil wherein thinly sliced bacon or other meat may be cooked in its own fat and maintained in a flat condition so that when finally prepared, it will be free of curls and flat.

Another object is to provide a cooking utensil as described wherein the fatty constituents of the meat are permitted to drain off in a drain area, thus to provide crisp slices of the meat as finally prepared thereon.

A further object is to provide a cooking utensil as described which is simple in construction, which is easily cleaned, and which may be manufactured at a relatively low cost.

Other objects, the advantages and uses of the invention will become apparent after reading the following specification and claims and after consideration of the drawing forming a part of this specification wherein:

Fig. 1 is a top plan view of my improved cooking utensil.

Fig. 2 is a side elevation of the utensil as illustrated in Fig. 1, and

Fig. 3 is a sectional view along the line 3—3 of Fig. 2.

With reference to the drawing, the device may comprise a sheet metal stamping 2 preferably of non-ferrous metal, such as aluminum or copper, a handle 3 therefor and a cover screen of heavy wire mesh hingedly mounted upon the stamping 2 as indicated at 6.

The stamping 2, forming the body of the cooking utensil, may be rectangular in shape with shallow sidewalls 7 extending about the entire perimeter thereof. The inner portion of the body is preferably formed with its bottom wall drawn upwardly to present a convex cylindrical surface 8 forming a curved surface upon which slices of the bacon or other thinly sliced meat may be placed as indicated at 9. The opposite end portions of the cylindrical surface 8 merge with the bottom wall 11 of the utensil as shown. This construction results in the draining of any fat or grease from the meat during the cooking operation into the bottom of the utensil between the upstanding convex portion and the sidewalls 7.

In order that the slices of bacon or other meat 9 may not become displaced from their position upon the surface 8 and to facilitate placement of the slices thereupon, I have formed the convex cylindrical surface portion 8 with upstanding beads 12 at opposite sides thereof, see Figure 3. The beads 12 also aid in guiding the fat and grease outwardly into the bottom of the utensil, thus in a measure basting the meat as the greases flow downwardly therefrom during cooking.

The screen cover 4 hingedly mounted as at 6 to the body 2 may be of sufficient weight and contour to closely follow the curvature of the surface 8 and to hold the meat flat in close contact with the surface during cooking. Any tendency of the slices to curl during the cooking operation is prevented by the screen 4 so that as the fat and greases are driven therefrom, either wholly or in part, the slices maintain a permanently flat and non-curling condition. In order to facilitate handling the screen cover 4, an eye 14 may be secured to the outer wall of the screen so as to aid in moving the screen upon its hinged mounting while hot. In Figs. 1 and 2, the screen cover is shown moved to one side as it would appear during the placing of the slices upon the utensil or during the operation of removing the slices therefrom.

In operation the utensil is placed over the burner of a stove, the handle 3 serving to provide a manual grip therefor. When the utensil has become sufficiently heated, slices of bacon as indicated at 9, may be placed upon the surface 8 in the manner shown and the cover 4 swung upon its hinged mounting 6 so as to overlie and contact the slices. With the parts in this position the bacon or other sliced meat is permitted to fry in its own fat or grease, fat and greases therefrom flowing downwardly into the lower portion of the utensils as they are driven from the body of the heat. It is entirely within the discretion of the person using the device as to just how crisp the meat may be cooked. Prolonged cooking will result in very crisp meat while a short cooking will result in retaining in the meat a large percentage of its fat and greases.

The cover 4 may be lifted at least once during the cooking operation to turn the slices and when finally prepared each slice will be found to lie flat and to be free of curls or curled portions as ordinarily present in the cooking of thin sliced meat in the conventional manner.

While I have illustrated and described the cover 4 as formed of wire mesh of a heavy grade, it will be obvious of course that this portion of the device may be made of a perforated sheet metal and likewise the utensil body may be made of a casting in place of a stamping, as suggested, without departing from the spirit and scope of the invention.

I claim:

1. A cooking utensil of the character described, comprising a body member having relatively shallow upstanding sidewalls at the perimeter thereof, said body having its mid-portion projecting upwardly to present a convex cylindrical supporting surface upon which slices of bacon or the like may be placed, and a reticulated cover hingedly mounted upon said body and conforming in contour with said supporting surface adapted to be swung into overlying relationship with respect to said surface.

2. In a cooking utensil, as defined in claim 1, means providing at the base of said convex cylindrical surface, a reservoir for receiving greases and fats.

3. A cooking utensil, as defined in claim 1, having beads formed at the sides of said convex cylindrical surface, whereby to prevent displacement of slices of bacon and the like laid upon said surface.

4. A cooking utensil, as defined in claim 1, wherein the said convex cylindrical surface extends upwardly beyond the plane of the top of said shallow sidewalls.

5. A cooking utensil, comprising a stamped sheet metal body of non-ferrous metal, said body being rectangular in shape and having sidewalls extending about its periphery, said body being further formed with a depression on its bottom wall, thereby to provide a convex cylindrical projection in the mid-portion of the body extending upwardly to a point beyond the top of said sidewalls, and a cover comprising wire screen curved to conform with the convex cylindrical surface of said body.

6. A cooking utensil, of the character described comprising a body member having a relatively shallow upstanding side wall about its periphery, said body having its mid-portion projecting upwardly to present a cooking surface upon which slices of bacon may be placed during the cooking operation, said surface being so formed as to cause said slices of bacon when resting thereupon to assume a continuously curved condition in one vertical plane and to lie flat and horizontally in any plane perpendicular to said first named plane.

7. A cooking utensil, of the character described comprising a body member having a relatively shallow upstanding side wall about its periphery, said body having its mid-portion projecting upwardly to present a cooking surface upon which slices of bacon may be placed during the cooking operation, said surface being so formed as to cause said slices of bacon when resting thereupon to assume a continuously curved condition in one vertical plane and to lie flat and horizontally in any plane perpendicular to said first named plane, and a member substantially conforming in contour to said cooking surface adapted to be placed over said slices of bacon to hold the same against curling away from said cooking surface during the cooking operation.

ROBERT G. FISHEL.